United States Patent
Schaffer et al.

(10) Patent No.: US 12,032,894 B2
(45) Date of Patent: Jul. 9, 2024

(54) SYSTEM AND METHOD FOR SYNCHRONIZING NET TEXT ACROSS HIERARCHICAL LEVELS

(71) Applicant: Synopsys, Inc., Mountain View, CA (US)

(72) Inventors: Louis Schaffer, Durham, NC (US); Kenter Lin, Mountain View, CA (US); Soo Han Choi, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 306 days.

(21) Appl. No.: 17/349,250

(22) Filed: Jun. 16, 2021

(65) Prior Publication Data

US 2021/0390244 A1      Dec. 16, 2021

Related U.S. Application Data

(60) Provisional application No. 63/039,924, filed on Jun. 16, 2020.

(51) Int. Cl.
| | | |
|---|---|---|
| G06F 30/30 | (2020.01) | |
| G06F 30/398 | (2020.01) | |
| G06F 40/55 | (2020.01) | |
| G06F 111/04 | (2020.01) | |
| G06F 113/18 | (2020.01) | |
| G06F 115/02 | (2020.01) | |

(52) U.S. Cl.
CPC ............ *G06F 30/398* (2020.01); *G06F 40/55* (2020.01); *G06F 2111/04* (2020.01); *G06F 2113/18* (2020.01); *G06F 2115/02* (2020.01)

(58) Field of Classification Search
CPC .... G06F 30/398; G06F 40/55; G06F 2111/04; G06F 2113/18; G06F 2115/02; G06F 30/31; G06F 30/3323; G06F 30/337; G06F 30/373; G06F 30/323
USPC ......................................................... 716/112
See application file for complete search history.

(56) References Cited

U.S. PATENT DOCUMENTS

| | | | |
|---|---|---|---|
| 6,591,402 B1* | 7/2003 | Chandra | G06F 30/33 716/106 |
| 6,601,205 B1* | 7/2003 | Lehmann | G11C 29/56 714/728 |
| 2007/0157140 A1* | 7/2007 | Holesovsky | G06F 30/398 716/112 |
| 2009/0313596 A1* | 12/2009 | Lippmann | G06F 30/327 716/126 |
| 2018/0075061 A1* | 3/2018 | Purumala | G06F 16/9537 |

* cited by examiner

*Primary Examiner* — Jack Chiang
*Assistant Examiner* — Brandon Bowers
(74) *Attorney, Agent, or Firm* — JAQUEZ LAND GREENHAUS & McFARLAND LLP; Bruce W. Greenhaus, Esq.

(57) ABSTRACT

A method and apparatus for identifying net text in a net list at each hierarchical level of the net list is disclosed. The identified net text is then associated with the hierarchical level in which the net text was found. Each cell in the net list can then be optimized by exploding the net list of at least one cell. Once exploded, the identified net text together with the associated hierarchical level of each progeny cell of each exploded cell is associated with the net list of the exploded cell.

14 Claims, 7 Drawing Sheets

SYSTEM AND METHOD FOR SYNCHRONIZING NET TEXT ACROSS HIERARCHICAL LEVELS

CROSS-REFERENCE TO RELATED APPLICATION—CLAIM OF PRIORITY

This application claims the benefit of priority to provisional Application No. 63/039,924 filed Jun. 16, 2020, entitled "Method and Apparatus for Synchronizing Net Text Across Hierarchical Levels", the disclosure of which is incorporated herein by reference in its entirety.

TECHNICAL FIELD

The present disclosure relates to design of integrated circuits and more particularly to synchronizing the text used to label nets of a hierarchical integrated circuit design.

BACKGROUND

An increasing number of integrated circuits (ICs) are being fabricated using a technology node of less than 7 nanometers (nm). In addition, design complexity is increasing. These two factors are combining to cause an increase in the number of circuits that are being integrated together from different sources. Layout designers are building chips using intellectual property (IP) blocks from different vendors. One consequence of this is that net labeling text for particular nets within an IC design may be inconsistent from one hierarchical level to another hierarchical level. A net refers to an electrical connection to one or more ports of a cell. Each net of a particular hierarchical level is associated with net text (i.e., a net label). By indicating that a particular port is on a particular net, that port is determined to be electrically connected to all other ports that are also on the same net. The net text associated with a net is local to a particular hierarchical level. That is, the net text associated with a first net in a first hierarchical level may be completely different from the net text associated with a net of a second hierarchical level, even though some points in the physical layout are common to the nets of the different hierarchical levels. A hierarchical net list of all the electrical connections in an IC design includes net text for each of the hierarchical levels in the design.

The use of a hierarchical structure having several hierarchical levels allows for designing integrated circuits using a modular top down approach. A hierarchical level may include one or more cells, which may be grouped as one or more circuit blocks. Both a cell and a circuit block can refer to a module or component representing a physical structure. The cell or circuit block can also refer to a virtual structure that is associated with the physical structure being simulated within a simulation. Parameters, such as the size of the cell, are specified for selected cells (based on 'standard cells'). Such parameters are made accessible in a database for use by EDA (Electronic Design Automation) products.

SUMMARY

A method is disclosed which comprises identifying net text within at least one hierarchical level of a net list. Text level information is associated with corresponding identified net text. The text level information is stored and the net list of at least one cell in the net list is exploded. In accordance with the method, the associated text level information can be retrieved for each corresponding identified net text within the exploded net list.

In some embodiments, the associated text level information can be retrieved using the net text as an index to the location at which the text level information was stored. In some embodiments net text from a first hierarchical level that differs from net text from a second hierarchical level, but that references the same net is identified. For each net referenced by differing net text, the net text used in the highest hierarchical level is selected. The differing net text with the selected net text is replaced within the exploded net list. In yet other embodiments, text level information is stored prior to replacing the differing net text. In some embodiments, the text level information includes information indicating from which hierarchical level the corresponding identified net text originated. In some embodiments, at least one hierarchical level is returned to the original net listing using the stored text level information. In some embodiments, design input is received, design rules are checked (DRC) and net text is provided for each of the nets in the net list that defines the design. The associated text level information is stored before replacing the differing net text and the DRC and error rule checking are performed.

In some embodiments, a system comprises a memory storing instructions and a processor, coupled with the memory and to execute the instructions. The instructions, when executed, cause the processor to identify net text within at least one hierarchical level of a net list, associate text level information with corresponding identified net text and store the text level information. The net list of at least one cell in the net list is exploded. The associated text level information can be retrieved for each corresponding identified net text within the exploded net list.

In some embodiments, the processor identifies net text from a first hierarchical level that differs from net text from a second hierarchical level, but that references the same net and for each net referenced by differing net text, selects the net text used in the highest hierarchical level. The processor further replaces within the exploded net list, the differing net text with the selected net text.

In some embodiments, when instructions are executed the processor stores text level information prior to replacing the differing net text. In some embodiments, the text level information includes information indicating from which hierarchical level the corresponding identified net text originated. In some embodiments, executing instructions causes the processor to return at least one hierarchical level to the original net listing using the stored text level information. A non-transitory computer readable medium is also disclosed comprising stored instructions, which when executed by a processor, cause the processor to identifying net text within at least one hierarchical level of a net list. Text level information is associated with corresponding identified net text. The text level information is stored and the net list of at least one cell in the net list is exploded. The associated text level information can be retrieved for each corresponding identified net text within the exploded net list. In some embodiments, when stored instructions are executed by a processor, the non-transitory computer readable medium further causes the processor to identify net text from a first hierarchical level that differs from net text from a second hierarchical level, but that references the same net. For each net referenced by differing net text, the net text used in the highest hierarchical level is selected. The differing net text with the selected net text is replaced within the exploded net list. In some embodiments, the non-transitory computer readable medium further causes the processor to store text level information prior to replacing the differing net text. In some of these embodiments, the text level information includes information indicating from which hierarchical level the corresponding identified net text originated. In some embodiments, at least one hierarchical level is returned to the original net listing using the stored text level information.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

In some cases in which a hierarchical netlist is used, the same net may or have one name in one hierarchical level and another name in a different hierarchical level. That is, some portions of a netlist have blocks of circuitry with nets that have names provided by one vendor, and other blocks with the nets provided by a different vendor, each with different names for nets that are electrically connected. This can be problematic when optimizing a netlist because once exploded, a physical verification (PV) tool can no longer determine which net name was associated with the highest hierarchical level and thus cannot properly select the name for the net. Exploding is a process by which net list entries from a child (i.e., lower included) hierarchical level are included in a parent (higher inclusive) hierarchical level net list.

In cases in which each cell has different net labeling text, tracking the text in the original hierarchy requires preventing the PV tool from exploding all cells. However, preventing cells from being exploded into a parent cell would degrade the performance of the PV tool, since maintaining one placement of each cell in a cell hierarchy provides no significant advantage, but requires the PV tool to traverse the various hierarchical levels to determine all of the connections in the design. The hierarchical PV tool would perform much better if allowed to explode these cells.

Aspects of the present disclosure relate to a method and apparatus for identifying net text in a net list at each hierarchical level of the net list. The identified net text is associated with the hierarchical level in which the net text was found. In some embodiments, each cell in the net list is optimized by exploding appropriate cells of the net list. Once exploded, the identified net text together with the associated hierarchical level of each child cell of each exploded cell is associated with the exploded cell in a way that allows that information to be accessed based on information in the net list of the exploded cell. This is further explained below. By providing information regarding the associated hierarchical level from which net text originated, a PV tool can operate more efficiently.

A PV tool is used to perform verification of an IC. In some embodiments, the PV tool relies upon a layout hierarchy to provide the list of nets that define the connections between components within the IC design. The layout hierarchy can be provided in either an original layout hierarchy or an exploded layout hierarchy. The original layout hierarchy shows what cells are present (and the nesting of the cells) at each of the hierarchical levels. In the exploded layout hierarchy, some of the netlist entries for cells within a child hierarchical level are brought into and included in the net list of a parent cell within a parent hierarchical level. Therefore, when a cell is exploded, the data in the cell is exploded into the parent cell. The netlist in the parent cell now includes nets from a lower hierarchical level.

Figure 1:
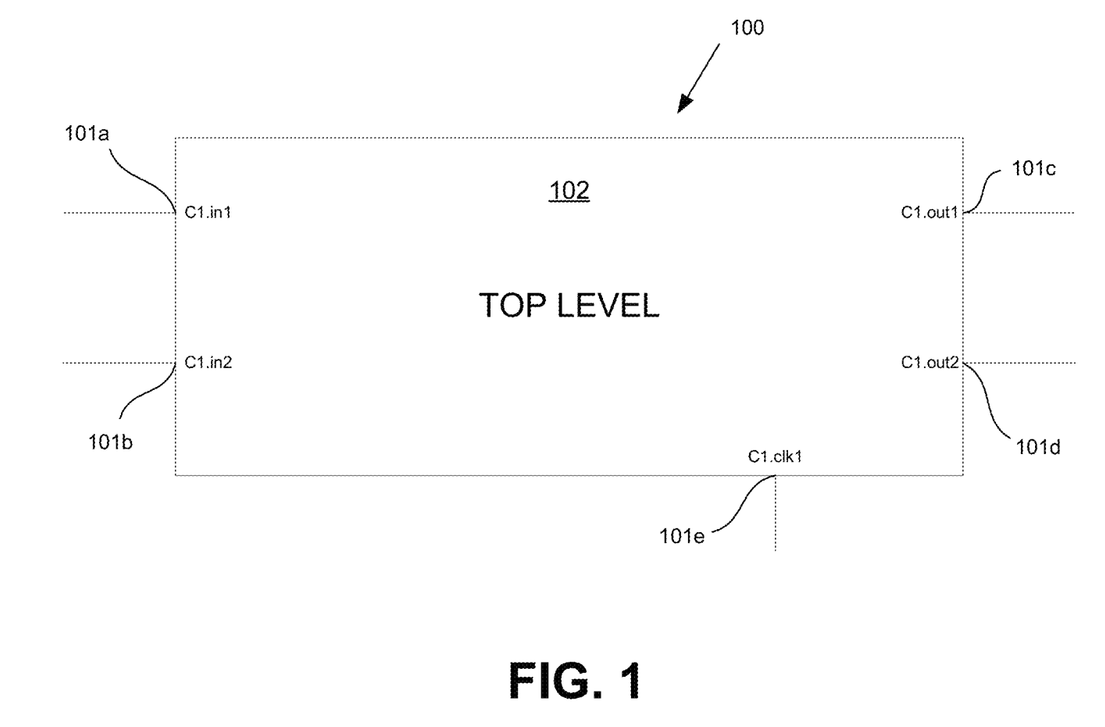
FIG. 1 is an illustration of a top hierarchical level having one cell.

FIG. 1 is an illustration of a top hierarchical level 100 having a top level cell 102. The top level cell 102 has five ports 101, two input ports 101a, 101b and two output ports 101c, 101d, and a clock port 101e. It should be noted that throughout this disclosure, features illustrated in the figures that are referenced by a common numeric portion followed by a unique alphabetic portion may be referenced collectively by the common numeric portion. For example, the ports 101a, 101b, 101c, 101d, 101e may be referenced collectively as port 101.

Port text associated with each port 101 is used in a net list to indicate both the cell and the particular port of the cell. For example, the first input port 101a may be identified by the port text C1.in1. The portion of the port text C1 indicates that the port is the first cell C1. The portion of the port text in1 indicates that this is a first input port of that cell. It should be noted that this port text format is merely provided as an example.

A port is a connection point that provides connectivity to circuitry in the cell. The top hierarchical level of a net list for the IC shown in FIG. 1 might look like the list shown in TABLE 1.

TABLE 1

| NET LIST: |
| --- |
| C1.in1 - Net1 |
| C1.in2 - Net2 |
| C1.out1 - Net3 |
| C1.out2 - Net4 |
| C1.clk1 - Net5 |

The net list has one entry for each port. There is only one net associated with a port. In contrast, there are typically (although not necessarily) multiple ports on a net. The net list of TABLE 1 indicates that there are five ports 101 associated with the top level cell 102 (identified as C1). In addition, there are five nets, each associated with a net text (e.g., Net1 through Net5). Each of the ports is on one of the nets. For example, C1.in1 (the first input port of the Top Cell C1) is on Net1. At this top hierarchical level, each net has only one port associated with it.

Figure 2:
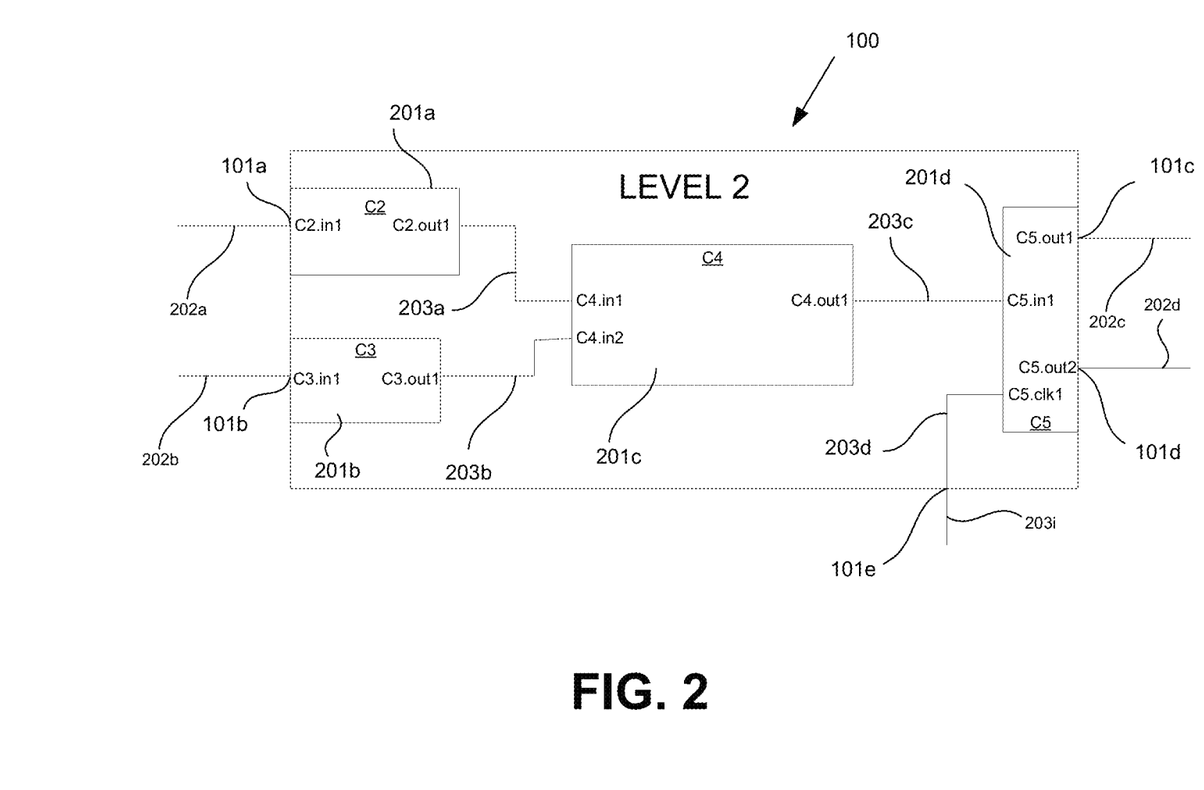
FIG. 2 is an illustration of a second hierarchical level in which four cells within the Top Cell are present.

FIG. 2 is an illustration of a second hierarchical level 200 in which four cells 201 (C2 to C5) reside within the top level cell 102. The first of these four cells 201a has an input port and an output port. The input port is identified by text C2.in1 and the output port is identified by text C2.out1. A net list for the second hierarchical level would have eleven entries; one for each of the eleven ports of the five cells. Each entry identifies a port and the net text associated with the net 202, 203 on which that port resides for the second hierarchical level 200.

TABLE 2 is a partial net list for the second hierarchical level 200. Note that only five of the 11 entries are shown in TABLE 2.

TABLE 2

| |
| --- |
| C2.in1 - NetA |
| C2.out1 - NetB |
| C4.in1 - NetB |
| C5.clk1 - NetC |
| C1.clk1 - NetC |

It can be seen that the port C2.in1 of the cell C2 in FIG. 2 is the same physical point 101a in the IC design as the point C1.in1 of cell C1 in FIG. 1. It should also be noted that the net 202a is also the same, but the net text associated with the net 202a in the top level hierarchy is Net1, while the net text associated with the net 202a in the second level hierarchy is NetA.

In the example shown in FIG. 1 and FIG. 2, the top hierarchical level 100 has one cell 102 having five nets 202 (each having one port 101 on the net). The second hierarchical level 200 (shown in FIG. 2) has four cells 201, and a total of eight nets 203, one for each of the connections between the cells (including the connections from pins of the IC to ports of the inputs of cells C2, C3 and to the outputs of the cell C5). It should be noted that the pins of the IC are not shown for the sake of simplicity.

Figure 3:
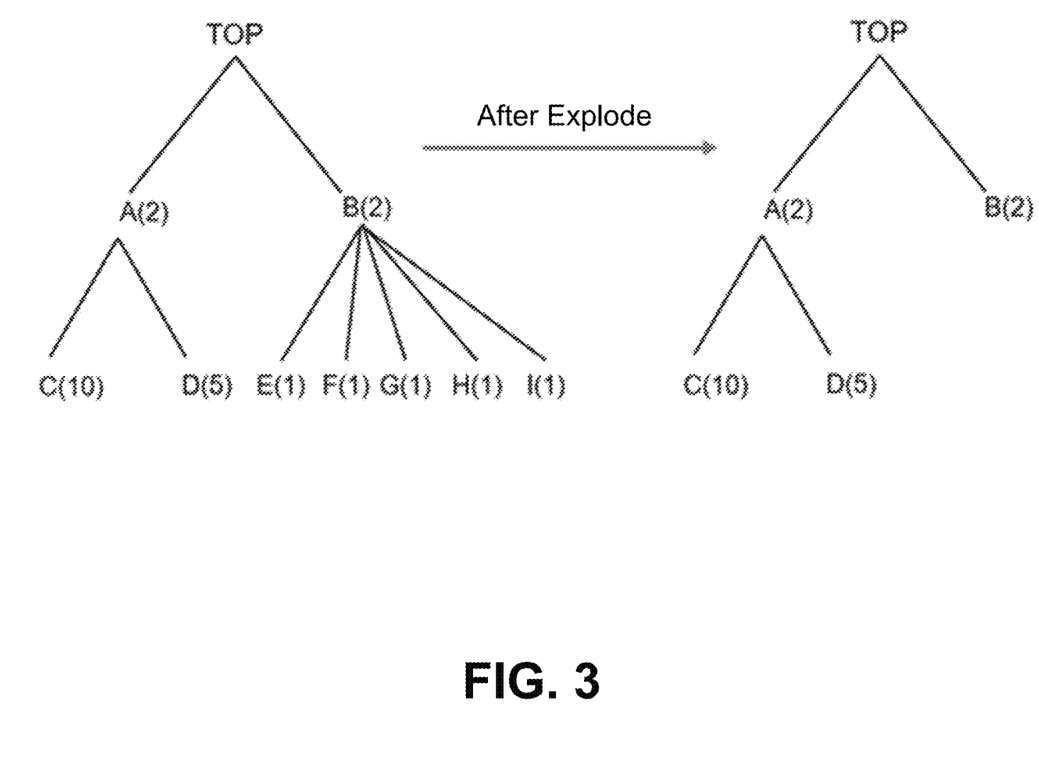
FIG. 3 is a simplified illustration of an original layout hierarchy and an exploded layout hierarch.

FIG. 3 is a simplified illustration of an original layout hierarchy and an exploded layout hierarchy. Note that the design in the example shown in FIG. 3 is different from that of the example shown in FIG. 1 and FIG. 2. On the left side of the FIG. 3, the original layout hierarchy is shown to have three levels. In the example shown, the top of the layout hierarchy has a single cell denoted as Top. The second level has the cells A(2) and B(2). The number shown within the parenthesis indicates the number of instances of the particular cell. For example, in the second level, there are two instances of the cell A and two instances of the cell B that are nested (i.e., that reside) within the top cell. At the third hierarchical level, there are ten instances of the cell C and five instances of the cell D nested in each of the two instances of the cell A of the second hierarchical level. Likewise, there is one instance of each of the cells E, F, G, H, and I nested in each of the two cells B of the second hierarchical level.

In some embodiments, it is desirable to explode the net list at a particular hierarchical level (i.e., expand the net list to include all of the nets that are present within at least one level below). The right side of FIG. 3 illustrates the layout hierarchy of the design after the net list for cell B in the second hierarchical level has been exploded. It can be seen that the cells E, F, G, H and I have been brought into cell B of the second hierarchical level. That is, the net list of cell B has been expanded (or exploded) to include all of the nets that are present in the cells E through I. Therefore, the cells E, F, G, H and I are no longer shown in the exploded layout hierarchy on the right side of FIG. 3.

However, a problem occurs if the text associated with the nets of the third hierarchical level that defines the connections for the cells E through I is not the same as the text associated with the nets in the second hierarchical level for those nets that are common to the second and third hierarchical levels.

Efficient execution of physical verification (PV) checks the text on the highest hierarchical level of a net. However, since layout designers build chips using circuit blocks (e.g., cells) from different vendors, different net labeling text can exist at various locations in the layout hierarchy. In some embodiments, the text that is selected for use throughout the design is the text of the highest hierarchical layer. In order for the PV tool to be able to select the highest hierarchical text accurately, the PV tool is restricted from making hierarchical optimizations, like exploding cells. By so limiting such optimizations, the text selected as the name for each net can be properly identified.

In some embodiments disclosed herein, text is selected according to the original layout hierarchy, while allowing the PV tool to explode the net list of hierarchical levels when it is beneficial to optimize the layout hierarchy in order to achieve better performance from the PV tool. Such embodiments provide two to three times better runtime. They also reduce amount of memory required by a factor of two to three. The disclosed method and apparatus can be used for any physical verification check requiring the PV tool to search for text at specific locations in the hierarchy, such as at the highest hierarchical net location or the top cell.

In accordance with some embodiments, a command is defined that stores the original text level information (i.e., records the level at which the text was originally used in the net list) and makes this information immune to hierarchy effects, such as losing track of the hierarchical level from which a net name originated. That is, by storing the original text level information, down-stream commands can use the information to perform several useful processes, such as selecting the highest level text of each net (i.e., the text used in the highest hierarchical level) to identify the net.

In some embodiments, text level information is recorded (stored at an appropriate memory location that can be accessed based on information in a netlist that will remain after optimizations, such as with the netlist) before any hierarchy optimizations are performed and before the original text information is applied to the final optimized (e.g., exploded) hierarchy. Text level information is information regarding the net text associated with each net, as well as the level associated with that net text. For example, in the case of the hierarchical level shown in FIG. 2 and associated netlist of TABLE 2, there are two entries associated with NetB, the first having net text C2.out1-NetB and the second having text C4.in1-NetB. Text level information that is stored has information that indicates in which hierarchical level the net text NetB was originally present (i.e., hierarchical level 2).

Figure 4:
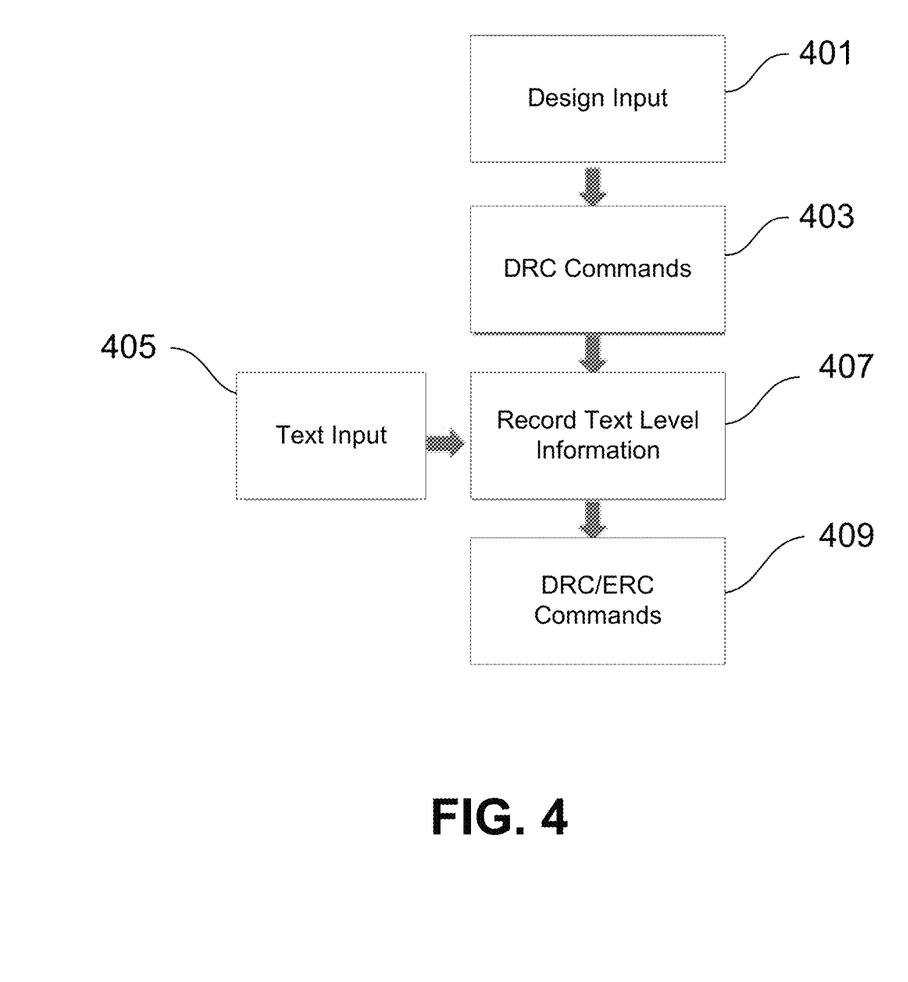
FIG. 4 illustrates a process that can be implemented in some embodiments in which the original text level information is stored.

FIG. 4 illustrates a process performed in accordance with some embodiments in which the text level information of the original layout hierarchy is recorded. Initially, an IC design is received (at 401). The design is then checked to determine whether there are any design rule violations (i.e., design rule checking (DRC) is performed) (at 403). Net text for each of the nets in a net list that defines the design is provided (at 405). The net text is then associated with text level information and the text level information is recorded for at least some of the nets (at 407). After recording the original text level information, the net list for at least one of the cells of the design can be exploded. The recorded hierarchical level information (i.e., the text level information) can then be retrieved for each corresponding identified net text within the exploded net list of the exploded cell. In some embodiments, the text level information can be retrieved using the net text as an index to the location where the text level information is stored. For each net in the net list of the exploded cell, the net text associated with the highest hierarchical level is used and the net text associated with that net at lower hierarchical levels is replaced with the net text of the higher hierarchical level. In some embodiments, the differing net text of the lower hierarchical level is discarded. In other embodiments, the net text of the lower hierarchal levels is saved for use later to return to the original net listing. Once the net text from the lower hierarchical levels has been associated with the net list of each exploded cell, DRC and Electrical Rule Checking (ERC) can be performed (at 409).

Figure 5:
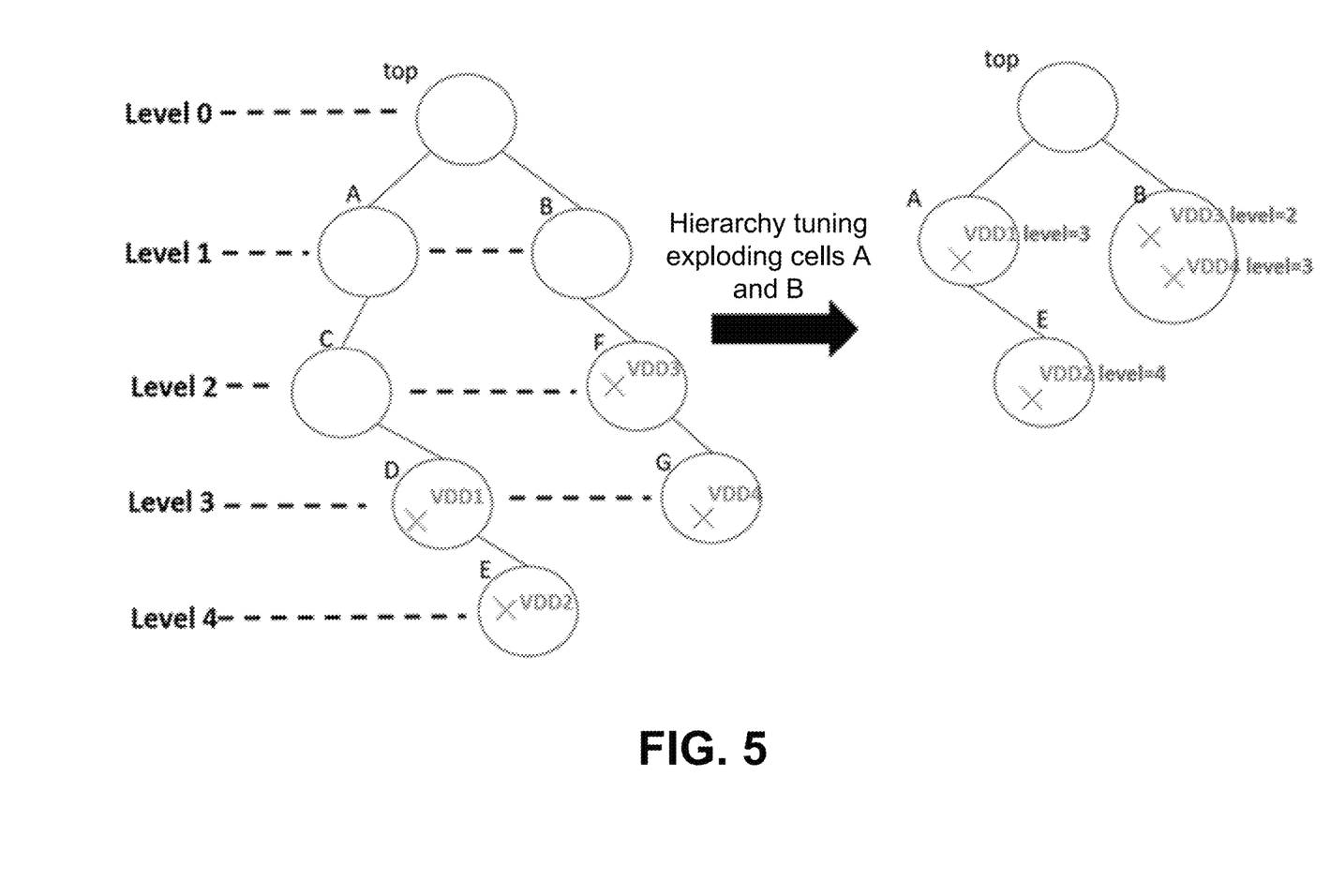
FIG. 5 illustrates an original hierarchy in which a top cell has two child cells A and B and an exploded layout.

FIG. 5 illustrates an original hierarchy in which a top cell has two child cells A and B (i.e., cells that are contained within the top cell). The cell A has a child cell C; cell C has a child cell D; cell D has a child cell E; cell B has a child cell F; and cell F has a child cell G.

Cell D has a net that is identified by the text VDD1, cell E has a net identified by the text VDD2, cell F has a net identified by the text VDD3 and cell G has a net identified by the text VDD4. It should be noted that while four nets have been identified in this example, there may be other nets in the cells without deviating from the scope of the present disclosure. The right side of FIG. 5 illustrates that after hierarchy tuning (i.e., exploding cells to improve performance of the PV tool), text VDD1 in cell D is associated with the ancestor cell A. In addition, text VDD3 is associated with cell B and the text VDD4 in cell G is associated with ancestor cell B. Although the hierarchy changes, by recording and associating the original level information for each text with the netlist of the exploded cell, even though the original level information may not stay with original cells, a PV tool can ascertain that VDD1 was originally in level 3, VDD2 was originally in level 4, VDD3 was originally in level 2, and VDD4 was originally in level 4.

In one embodiment, having this information allows a determination to be made as to which net text to use for each net by selecting the text for each net that is associated with the highest hierarchical level.

Figure 6:
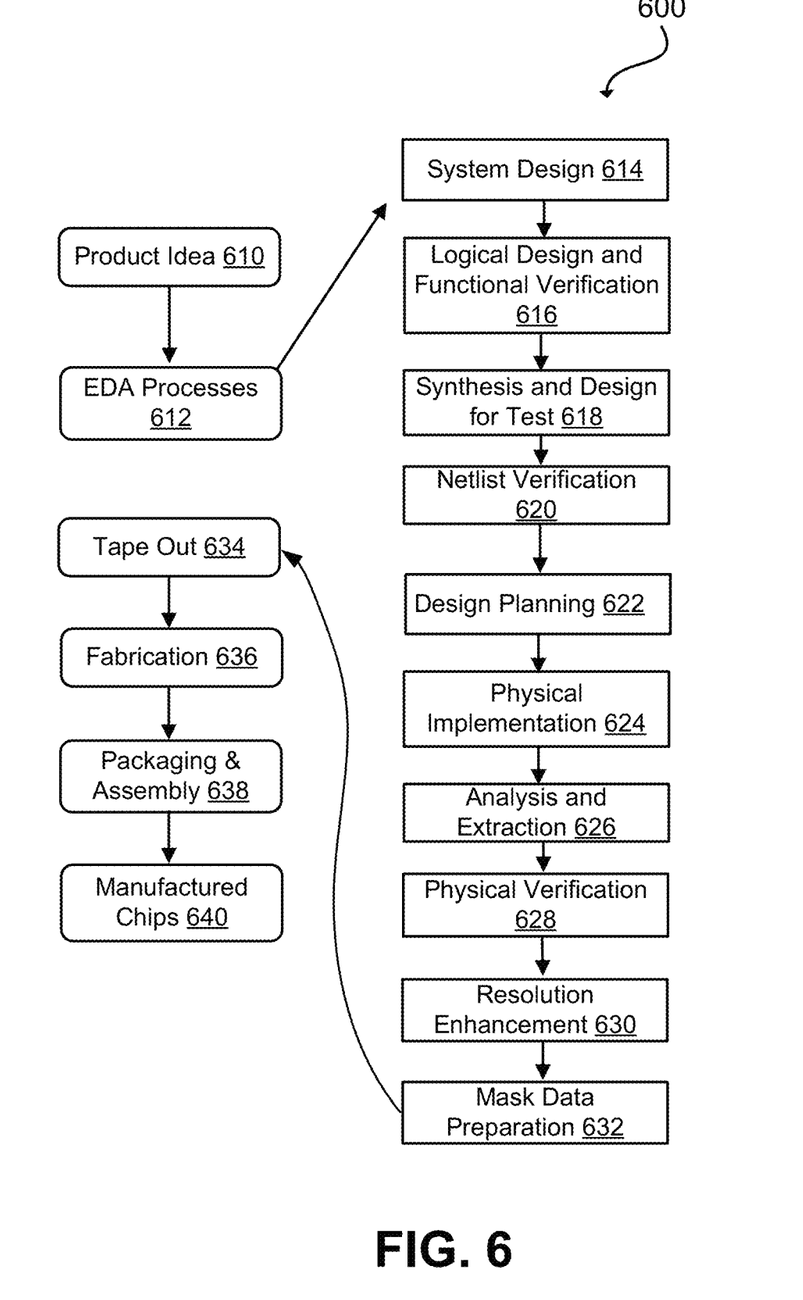
FIG. 6 illustrates an example set of processes used during the design, verification, and fabrication of an article of manufacture, such as an IC, to transform and verify design data and instructions that represent the IC.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and are made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 800 of FIG. 8, or host system 707 of FIG. 7) may be used to store the programs and data structures that are used by some or all of the EDA products described herein, and products used for development of cells for the library and for physical and logical design that use the library.

Figure 7:
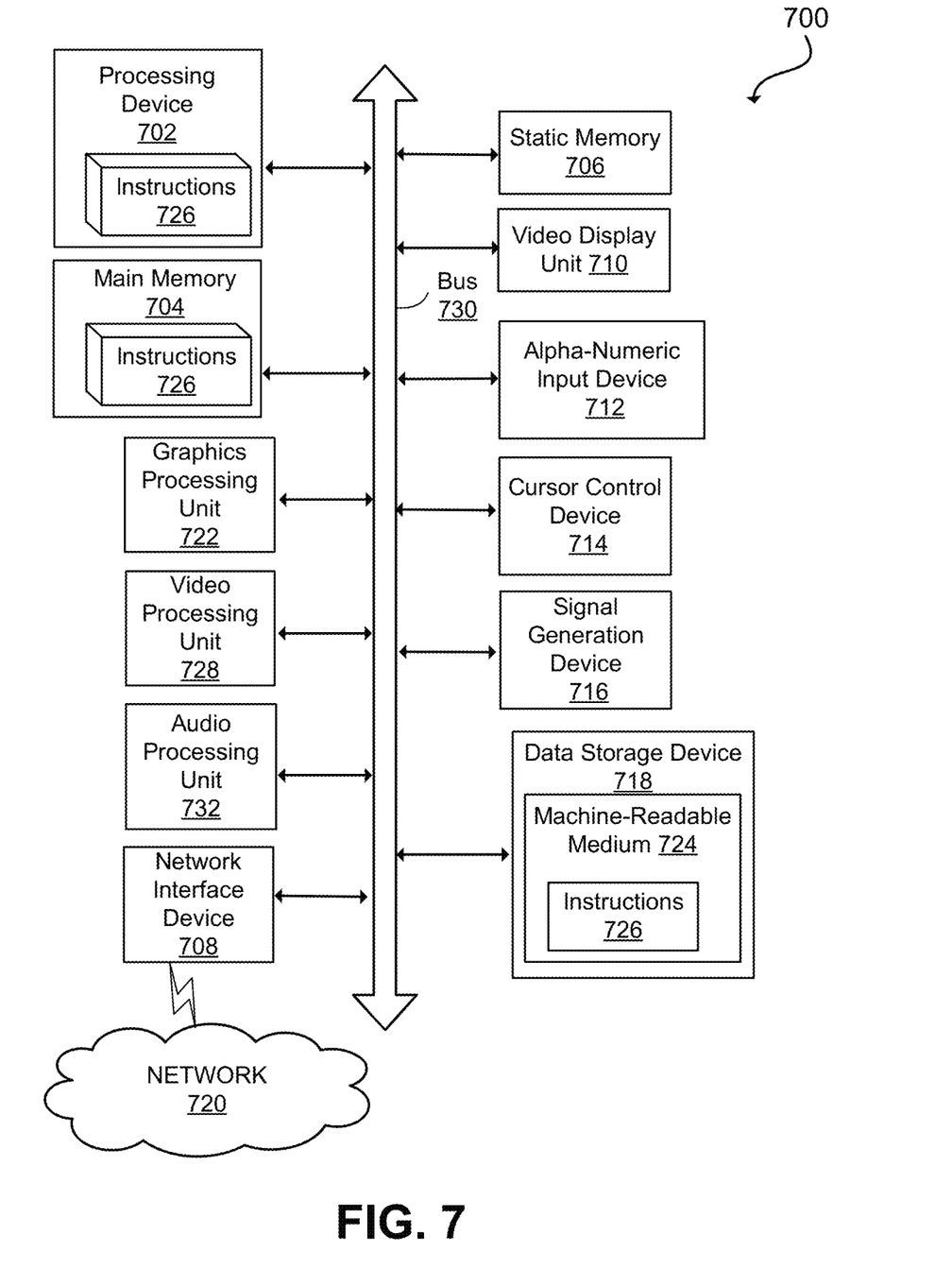
FIG. 7 illustrates an example machine of a computer system in which a set of instructions may be executed to cause the machine to perform one or more processes.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   identifying net text from a first hierarchical level of a net list that differs from net text from a second hierarchical level of the net list, wherein the net text from the first hierarchical level and the net text from the second hierarchical level reference the same net;
   associating text level information with the net text of the first and second hierarchical levels;
   exploding a portion of the net list that is associated with at least one cell in the net list;
   for each net referenced by differing net text, selecting the net text used in the highest hierarchical level based on the associated text level information; and
   replacing within the exploded net list, the differing net text with the selected net text.

2. The method of claim 1, further comprising storing text level information prior to replacing the differing net text.

3. The method of claim 2, where the associated text level information can be retrieved using the net text as an index to the location at which the text level information was stored.

4. The method of claim 2, wherein the text level information includes information indicating from which hierarchical level the corresponding identified net text originated.

5. The method of claim 4, further comprising returning at least one hierarchical level to the original net listing using the stored text level information.

6. The method of claim 1, further comprising:
   receiving design input;
   performing design rule checking (DRC);
   providing net text for each of the nets in the net list that defines the design;
   storing the associated text level information before replacing the differing net text; and
   performing the DRC and error rule checking.

7. A system comprising:
   a memory storing instructions; and
   a processor, coupled with the memory and to execute the instructions, wherein the instructions when executed cause the processor to:
   identify net text from a first hierarchical level that differs from net text from a second hierarchical level of a net list, wherein the net text from the first hierarchical level and the net text from the second hierarchical level reference the same net;
   associate text level information with the net text of the first and second hierarchical levels;
   explode a portion of the net list that is associated with at least one cell in the net list;
   for each net referenced by differing net text, select the net text used in the highest hierarchical level based on the associated text level information; and
   replace within the exploded net list, the differing net text with the selected net text.

8. The system of claim 7, wherein the instructions when executed further cause the processor to store text level information prior to replacing the differing net text.

9. The system of claim 8, wherein the text level information includes information indicating from which hierarchical level the corresponding identified net text originated.

10. The system of claim 7, wherein the instructions when executed further cause the processor to return at least one hierarchical level to the original net listing using the stored text level information.

11. A non-transitory computer readable medium comprising stored instructions, which when executed by a processor, cause the processor to:
    identify net text from a first hierarchical level that differs from net text from a second hierarchical level of a net list, wherein the net text from the first hierarchical level of a net list and the net text from the second hierarchical level of the net list reference the same net;
    associate text level information with the net text from the first and second hierarchical levels;
    explode a portion of the net list that is associated with at least one cell in the net list;
    for each net referenced by differing net text, select the net text used in the highest hierarchical level based on the associated text level information; and
    replace within the exploded net list, the differing net text with the selected net text.

12. The non-transitory computer readable medium of claim 11, wherein the stored instructions, when executed by a processor, further cause the processor to store text level information prior to replacing the differing net text.

13. The non-transitory computer readable medium of claim 11, wherein the text level information includes information indicating from which hierarchical level the corresponding identified net text originated.

14. The non-transitory computer readable medium of claim 11, wherein the stored instructions, when executed by a processor, further cause the processor to return at least one hierarchical level to the original net listing using the stored text level information.

\* \* \* \* \*